United States Patent [19]

Talley et al.

[11] Patent Number: 4,584,332

[45] Date of Patent: Apr. 22, 1986

[54] FLAME RETARDANT POLYPHENYLENE OXIDE THERMOPLASTICS

[75] Inventors: John J. Talley, Clifton Park; Carol B. Berman, Albany, both of N.Y.

[73] Assignee: General Electric Company, Schenectady, N.Y.

[21] Appl. No.: 651,543

[22] Filed: Sep. 17, 1984

[51] Int. Cl.$^4$ .......................... C08K 3/22; C08K 5/49; C08K 5/51
[52] U.S. Cl. .................................... 524/122; 524/137; 524/432; 525/68; 525/905
[58] Field of Search ....................... 524/122, 137, 432; 525/68, 905

[56] References Cited

U.S. PATENT DOCUMENTS

| | | | |
|---|---|---|---|
| 3,383,435 | 5/1968 | Cizek | 525/905 |
| 3,755,250 | 8/1973 | Wollensak et al. | 524/137 |
| 3,929,931 | 12/1975 | Izawa et al. | 525/905 |
| 3,943,191 | 3/1976 | Cooper et al. | 525/905 |

FOREIGN PATENT DOCUMENTS 128731  10/1982  Japan ................... 525/137

*Primary Examiner*—Jacob Ziegler
*Attorney, Agent, or Firm*—William A. Teoli; James C. Davis, Jr.; James Magee, Jr.

[57] ABSTRACT

Flame retardant blends of styrene and polyphenylene oxide are provided resulting from the use of a mixture of zinc oxide and a triorganothiophosphate.

7 Claims, No Drawings

FLAME RETARDANT POLYPHENYLENE OXIDE THERMOPLASTICS

CROSS REFERENCE TO RELATED APPLICATIONS

Reference is made to my copending application 651,542, filed Sept. 17, 1984 for Flame Retardant Polyphenylene Oxide Thermoplastics, filed concurrently herewith and assigned to the same assignee as the present invention.

BACKGROUND OF THE INVENTION

Prior to the present invention as shown by Cizek U.S. Pat. No. 3,383,435, assigned to the same assignee as the present invention and incorporated herein by reference, thermoplastic resin compositions were provided comprising a polyphenylene ether and a styrene resin. Other thermoplastic compositions are shown by Izawa et al., U.S. Pat. Nos. 3,929,930 and 3,929,931, incorporated herein by reference, which are polyphenylene ether having polystyrene grafted onto the backbone. Although these materials in the form of shaped articles have high impact strength, stiffness, good surface appearance, heat resistance and other desirable properties during or after molding, a major shortcoming of these materials as thermoplastics resins is their normally flammable nature. As a result, flame retardant and/or drip retardant agents are commonly incorporated into such blends of polyphenylene ethers and styrene resin prior to molding.

The flammability of normally flammable thermoplastic polymers have been reduced by using antimony-, halogen-, phosphoous- or nitrogen-containing additives commonly referred to as flame retardant agents. For example, aromatic phosphates such as triphenylphosphate or a combination of such compounds with other compounds such as halogenated aromatics have been added as flame retardant agents as shown by Haas, U.S. Pat. No. 3,639,506.

As shown in copending application 651,542 filed Sept. 17, 1984, significant improvements with respect to imparting improved flame retardant properties to polyphenylene oxide-polystyrene blends have been achieved by utilizing an effective amount of an organothiophosphate as a flame retardant in such polyphenylene oxide-polystyrene blends. It has been found, however, that while the employment of minor amounts of organothiophosphates in polyphenylene oxide-polystyrene blends have imparted improved flame retardant properties to such blends without adversely affecting the heat distortion property of such molded materials, the resulting molded products often have an undesirable sulfur odor.

The present invention is based on the discovery that flame retardant polyphenylene oxide-polystyrene blends can be made in accordance with the practice of the present invention by utilizing a minor amount of an organothiophosphate in combination with an effective amount of zinc oxide which has been found to improve the flame retardant performance of such polyphenylene oxide-polystyrene blends without adversely affecting the heat distortion temperature of such molded blends while resulting in the production of molded parts which are substantially free of undesirable sulfur odor.

STATEMENT OF THE INVENTION

There is provided by the present invention flame retardant thermoplastic selected from the class consisting of blends and grafted copolymers comprising by weight
 (A) 100 parts of polyphenylene oxide
 (B) 20 to 300 parts of styrene resin and
 (C) an effective amount of an organothiophosphate
 (D) 0.01 to 3.0 part of zinc oxide, per part of the organothiophosphate having the formula

where R is a $C_{(1-13)}$ monovalent radical or substituted $C_{(1-13)}$ monovalent hydrocarbon radical, Q is a monovalent group selected from

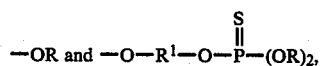

$R^1$ is selected from divalent $C_{(2-20)}$ hydrocarbon radicals and substituted divalent $C_{(2-20)}$ hydrocarbon radicals.

Radicals included within R of formula (1) are, for example, $C_{(1-8)}$ alkyl radicals such as methyl, ethyl, propyl, butyl, pentyl, hexyl, etc.; $C_{(6-13)}$ aryl radicals such as phenyl, tolyl, xylyl, maphthyl, and $C_{(1-8)}$ alkoxy and halogenated derivatives of such aryl radicals. Radicals included within $R^1$ are, for example, alkylene radicals such as dimethylene, trimethylene, tetramethylene, hexamethylene and branched alkylene radicals; arylene radicals such as phenylene, toluene, xylylene, and divalent radicals having the formula

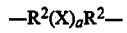

where $R^2$ is a divalent $C_{(6-13)}$ arylene radical, X is a divalent radical selected from O, S and $C_yH_{2y}$, y is a whole number from 1 to 5 inclusive, and a is 0 or 1.

Some of the organothiophosphates which are included within formula (1) are, for example, triphenyl thiophosphate, tri o-cresyl thiophosphate, tri m-cresyl thiophosphate, tri p-cresyl thiophosphate, trixylyl thiophosphates, tris-trimethylphenyl thiophosphates, trimethyl thiophosphate, tripropyl thiophosphate, phenyl dimethyl thiophosphate, tri-p-chlorophenyl thiophosphate and the like.

As used hereinafter, the expression "effective amount of organothiophosphate of formula (1) is that amount which is sufficient to provide from 0.5% to 5% by weight of phosphorous based on the weight of flame retardant polyphenylene oxide blends.

The polyphenylene ether or polyphenylene oxide resin which can be used in the practice of the present invention is shown by the following formula

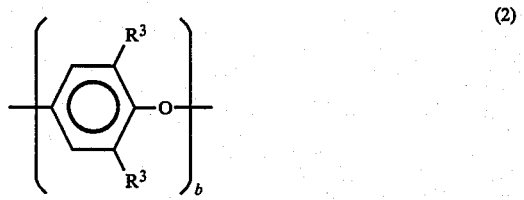

where $R^3$ is a monovalent radical selected from the class consisting of hydrogen, halogen, hydrocarbon radicals free of a tertiary α-carbon atom, halogenated hydrocarbon radicals having at least two carbon atoms between the halogen atom and the phenyl nucleus, hydrocarbonoxy radicals and halogenated hydrocarbonxy radicals having at least two carbon atoms between the halogen atom and the phenyl and b is an integer having a value of at least 50.

A more preferred class of polyphenylene ether resins for the compositions of the present invention include those of formula (2) where $R^3$ is alkyl and, most preferably, having from 1 to 4 carbon atoms. Illustratively, members of this class include poly(2,6-dimethyl-1,4-phenylene)ether; poly(2,6-diethyl-1,4-phenylene)ether; poly(2methyl-6-ethyl-1,4-phenylene)ether; poly(2-methyl-6-propyl,4-phenylene)-ether; poly(2,6-dipropyl-1,4-phenylene)ether; polu(2-ethyl-6-propyl-1,4-phenylene)ether; and the like.

Especially preferred is poly(2,6-dimethyl-1,4-phenylene)ether, preferably, having an intrinsic viscosity of about 0.45 deciliters per gram (dl./g.) as measured in chloroform at 30° C.

The preparation of the polyphenylene ether resins is described in Hay, U.S. Pat. Nos. 3,306,874 and 3,306,875 and in Stamatoff, U.S. Pat. Nos. 3,257,357 and 3,257,358, which are incorporated herein by reference.

The preferred styrene resins will be those having at least 25% by weight of repeating units derived from a vinyl aromatic compound of the formula:

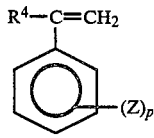

(3)

where $R^4$ is selected from hydrogen, $C_{(1-5)}$ alkyl and halogen, Z is selected from vinyl, hydrogen, halogen and $C_{(1-8)}$ alkyl, and p is a whole number equal to 0 to 5 inclusive.

The term "styrene resins" is used broadly to define components fully described is Cizek, U.S. Pat. No. 3,383,435, the disclosure of which is incorporated herein by reference. Such resins include homopolymers, such as polystyrene, polychlorostyrene and polyvinyl toluene, the modified polystyrenes such as rubber modified polystyrene blended or grafted high impact products, e.g., the rubber being a polybutadiene or an elastomeric copolymer of styrene and a diene monomer. Also included are styrene containing copolymers, such as styrene-acrylonitrile copolymers (SAN), styrene-butadiene copolymers, styrene-acrylonitrilebutadiene terpolymers (ABS), styrene-maleic anhydrice copolymers, polyalpha-methylstyrene, copolymers of ethyl vinyl benzene and divinylbenzene, and the like. In instances where the method of Izawa et al. is used to make thermoplastic materials, U.S. Pat. Nos, 3,929,930 and 3,929,931, polyphenylene oxide is heated with a styrene monomer shown by formula 3 in the presence of a free radical initiator resulting in a graft polyphenylene ether-polystyrene copolymer.

Special mention is made of a preferred class of styrene containing resins. These are known as "HIPS" resins, for high impact polystyrenes, in which the impact modifier comprises one or more of an ethylene/propylene/diene terpolymer, or a hydrogenated erivative, a vinyl aromatic/diene block copolymer resin, or a hydrogenated derivative, a hydrogen saturated vinylaromatic/diene random copolymer, a radical teleblock copolymer of a vinyl aromatic compound and a diene, a vinyl aromatic/methacrylic or acrylic acid or ester/diene terpolymer, and the like. These specialty HIPS resins are commercially available or can be prepared by those skilled in this art.

The compositions of the invention can also further include reinforcing agents, preferably fibrous glass reinforcements, alone or in combination with non-glass reinforcing fillers. The fibrous glass is especially preferably fibrous glass filaments comprised of lime-aluminum borosilicate glass which is relatively soda free, known as "E" glass. However, other glasses are useful where electrical properties are not so important, e.g., the low soda glass known as "C∞ glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcements comprise from about 1 to about 80% by weight based on the combined weight of glass and polymers and preferably, from about 10 to about 50% by weight. Especially preferable, the glass will comprise from about 10 to about 40% by weight based on the combined weight of glass and resin. Generally, for direct molding use, up to about 50% of glass can be present without causing flow problems. However, it is useful also to propare the compositions containing substantially greater quantities, e.g., up to 70 to 80% by weight of glass. These concentrates can then by custom blended with blends of resins that are not glass reinforced to provide any desired glass content of a lower value.

Other ingredients, such as stabilizers, pigments, plasticizers, antioxidants, and the like, can be added for their conventionally employed purposes.

The manner in which the present compositions are prepared is not critical and conventional methods can be employed. Preferably, however, each of the ingredients is added as part of a blend premix, and the latter is passed through an extruder, e.g., a 28 mm. WP twin screw extruder, at an extrusion temperature of from about 500° to about 600° F., dependent on the needs of the particular composition. The strands emerging from the extruder may be cooled, chopped into pellets and molded to any desired shape.

In order to allow those skilled in the art to better practice the present invention, the following example is given by way of illustration and not by way of limitation. All parts are by weight.

EXAMPLE 1

A mixture of 310 grams of triphenylphosphite and 32 grams of sulfur was heated to 150° C. resulting in an exothermic reaction. The mixture was cooled to room temperature and vacuum distilled to give 310 grams or 93% yield of a clear liquid having a boiling point of 185°–190° C. at 0.15 torr. A solid was obtained having a melting point of about 55° C. when the product was allowed to solidify upon standing. Based on method of preparation and its NMR and IR spectra, the product was triphenylthiophosphate.

Several blends were prepared consisting of 40 parts of polyphenylene oxide having an intrinsic viscosity of about 0.45 deciliters per gram (dl/g) as measured in chloroform at 30° C., 60 parts of Foster Grant high impact polystyrene and a sufficient triphenylthiophosphate to provide about 1% by weight of phosphorous in the blend. The mixture was added to a Henchel mixer and thoroughly mixed for 5 minutes. The mixture was then extruded at 300° C. using a Werner and Pfleiderer extruder. The resulting resin strands were then chopped into ⅛ inch×⅛ inch pellets which were molded into 5 inch×½ inch bars in accordance with Underwriter's Laboratories Bulletin No. 94.

Additional blends were prepared free of a flame retardant. In addition, various blends were also prepared which contain ed triphenylphosphate in place of triphenylthiophosphate. There was also prepared 40:60 blends of polyphenylene oxide and high impact polystyrene in further combination with a mixture of triphenylthiophosphate and zinc oxide. The various blends were then molded at 250° C. and evaluated for flame retardancy using the UL-94 test in the form of ⅛ inch bars as described above. The following results were obtained where "F.R." means flame retardant, "FOT" means flame out time in seconds and "HDT," means heat distortion temperature in °F.

| F.R. | WT % FR | Wt % ZnO | FOT (sec) | HDT (°F.) |
|---|---|---|---|---|
| none | | | | |
| (PhO)$_3$P=O | 12.0 | — | 5.9 | 173.1 |
| (PhO)$_3$P=O | 16.0 | — | 5.2 | 162.1 |
| (PhO)$_3$P=S | 12.4 | | 3.4 | 173.4 |
| (PhO)$_3$P=S | 9.94 | | 3.5 | 183.7 |
| (PhO)$_3$P=S | 7.44 | | 5.5 | 194.9 |
| (PhO)$_3$P=S | 12.4 | 1.1 | 2.6 | 169.4 |
| | 12.4 | 0.22 | 3.4 | 172.5 |
| | 12.4 | 0.11 | 3.2 | 173.0 |
| | 12.4 | 0.055 | 4.3 | 173.1 |

The above results show that the combination of the triphenylthiophosphate and the zinc oxide provided the best flame retardant properties while minimizing any change in the heat distortion temperature. It was further found that the bars containing from 0.11 to 1.1% by weight of zinc oxide were substantially free of sulfur odor while the compositions containing 0.55 wt. % of zinc oxide had an odor similar to the bars free of zinc oxide.

Although the above example is directed to only a few of the very many variables which can be utilized in the practice of the present invention, it should be understood that the present invention is directed to a much broader variety of polyphenylene oxide-polystyrene formulations which exhibit value flame retardant properties and are substantially free of sulfur odor when utilizing the organothiophosphates of formula (1) in combination with zinc oxide and a polyphenylene oxide and polystyrene resin as shown in the description preceding this example.

What is claimed is:

1. A flame retardant thermoplastic blend comprising by weight
   (A) 100 parts of polyphenylene oxide,
   (B) 20 to 300 parts of styrene resin and
   (C) 0.01 to 3 parts of zinc oxide per part of organothiophosphate having the formula $$(RO)_2\overset{\displaystyle S}{\underset{\displaystyle \|}{P}}-Q$$

which is utilized in the flame retardant thermoplastic blend in an amount of sufficient to provide from 0.5% to 5% by weight of phosphorous based on the weight of flame retardant thermoplastic blend, where R is a C$_{(1-13)}$ monovalent hydrocarbon radical or substituted C$_{(1-13)}$ monovalent hydrocarbon radical, Q is a monovalent group selected from the class consisting of $$-OR \text{ and } -O-R^1-O-\overset{\displaystyle S}{\underset{\displaystyle \|}{P}}-(OR)_2$$

R$^1$ is selected from the class consisting of divalent C$_{(2-20)}$ hydrocarbon radicals, halogenated divalent C$_{(2-20)}$ hydrocarbon radicals and divalent radicals having the formula $$-R^2(X)_aR^2-$$

where R$^2$ is a divalent C$_{(6-13)}$ arylene radical, X is a divalent radical selected from O, S, and C$_y$H$_{2y}$, y is a whole number from 1 to 5 inclusive and a is 0 or 1.

2. A flame retardant composition comprising a polyphenylene oxide-polystyrene graft copolymer, the amount of the organothiophosphate in accordance with claim 1 and from 0.01 to 3 parts of zinc oxide, per part of such organothiophosphate.

3. A composition in accordance with claim 1 where the organothiophosphate is triphenylthiophosphate.

4. A composition in accordance with claim 1 where the organothiophosphate is tri-4-methylphenylthiophosphate.

5. A composition in accordance with claim 1 where the organothiophosphate is tri-3-methylphenylthiophosphate.

6. A composition in accordance with claim 1 where the organothiophosphate is tri-2-methylphenylthiophosphate.

7. A composition in accordance with claim 1 where the organothiophosphate is tri-2,4-dimethylphenylthiophosphate.

* * * * *